United States Patent
Nagata et al.

(10) Patent No.: US 9,598,012 B2
(45) Date of Patent: Mar. 21, 2017

(54) SURROUNDINGS MONITORING SYSTEM FOR A VEHICLE

(71) Applicant: Toyota Motor Engineering & Manufacturing North America, Inc., Erlanger, KY (US)

(72) Inventors: Katsumi Nagata, Ann Arbor, MI (US); Charan Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 295 days.

(21) Appl. No.: 14/205,296

(22) Filed: Mar. 11, 2014

(65) Prior Publication Data

US 2015/0258935 A1    Sep. 17, 2015

(51) Int. Cl.
*B60R 1/00* (2006.01)
*H04N 7/18* (2006.01)

(52) U.S. Cl.
CPC .............. *B60R 1/00* (2013.01); *H04N 7/181* (2013.01); *B60R 2300/102* (2013.01);
(Continued)

(58) Field of Classification Search
CPC .............. B60R 1/00; B60R 2300/102; B60R 2300/105; B60R 2300/207;
(Continued)

(56) References Cited

U.S. PATENT DOCUMENTS 5,993,318 A * 11/1999 Kousaki ................. A63F 13/10
                                                                434/69
6,535,242 B1   3/2003 Strumolo et al.
(Continued)

OTHER PUBLICATIONS

Provision Interactive Technologies, "Provision Interactive and Daihatsu Team Up to Create Car of the Future with 3-D Warnings", Market Wire, Mar. 26, 2008, printed from http://www.reuters.com/article/2008/03/26/iudUS134141+26-Mar-2008+MW20080326 in 5 pages.
(Continued)

*Primary Examiner* — Brian Yenke
(74) *Attorney, Agent, or Firm* — Christopher G. Darrow; Darrow Mustafa PC

(57) ABSTRACT

A surroundings monitoring system includes a first sensor subsystem operable to provide image data from around the vehicle; a second sensor subsystem operable to provide non-image data from around the vehicle; a control subsystem in communication with the first sensor subsystem and the second sensor subsystem, the control subsystem operable to generate manipulated image data symbology from the image data and arrange the manipulated image data symbology in response to the non-image data to generate a driver perspective view; and a display in communication with the control subsystem to display the driver perspective view. A method of monitoring surroundings for use in a vehicle includes obtaining image data from around the vehicle; obtaining non-image data from around the vehicle; manipulating the image data in response to the non-image data to generate a driver perspective view; and displaying the driver perspective view.

14 Claims, 5 Drawing Sheets

(52) U.S. Cl.
CPC ... *B60R 2300/105* (2013.01); *B60R 2300/301* (2013.01); *B60R 2300/605* (2013.01)

(58) Field of Classification Search
CPC ........ B60R 2300/301; B60R 2300/303; B60R 2300/305; B60R 2300/60; B60R 2300/605; B60R 2300/607
See application file for complete search history.

(56) References Cited

U.S. PATENT DOCUMENTS

| | | | | |
|---|---|---|---|---|
| 8,103,889 | B2* | 1/2012 | Naik | G06F 1/32 713/320 |
| 8,780,202 | B2* | 7/2014 | Yamada | B60R 1/00 348/148 |
| 8,830,046 | B2* | 9/2014 | Yagi | B60R 1/00 340/436 |
| 8,842,176 | B2* | 9/2014 | Schofield | B60R 1/00 348/113 |
| 8,854,466 | B2* | 10/2014 | Matsukawa | B60R 1/00 348/148 |
| 8,885,045 | B2* | 11/2014 | Yanagi | B60R 1/00 348/147 |
| 8,908,035 | B2* | 12/2014 | Russ | B60R 1/00 348/113 |
| 8,953,011 | B2* | 2/2015 | Lang | B60R 1/00 340/425.5 |
| 8,970,451 | B2* | 3/2015 | Nagasawa | B60K 35/00 345/7 |
| 8,988,525 | B2* | 3/2015 | Thompson | B60R 1/00 348/148 |
| 9,025,819 | B2* | 5/2015 | Sung | G06K 9/00805 382/103 |
| 9,041,809 | B2* | 5/2015 | Miyoshi | B60R 1/00 348/148 |
| 9,050,931 | B2* | 6/2015 | Yamamoto | G06K 9/00791 |
| 9,064,293 | B2* | 6/2015 | Mitsugi | G06T 3/00 |
| 9,073,483 | B2* | 7/2015 | Ikeda | B60R 1/00 |
| 9,073,484 | B2* | 7/2015 | Aimura | B60R 1/00 |
| 9,094,583 | B2* | 7/2015 | Shih | H04N 7/183 |
| 9,128,290 | B2* | 9/2015 | Kim | G02B 23/12 |
| 9,135,754 | B2* | 9/2015 | Ng-Thow-Hing | G06T 19/006 |
| 9,156,402 | B2* | 10/2015 | Nagamine | B60R 1/00 |
| 9,219,887 | B2* | 12/2015 | Iga | B60R 1/00 |
| 9,242,602 | B2* | 1/2016 | Corcoran | B60R 1/00 |
| 9,272,731 | B2* | 3/2016 | Okamoto | B60R 1/00 |
| 2003/0085999 | A1* | 5/2003 | Okamoto | B60R 1/00 348/148 |
| 2008/0008355 | A1* | 1/2008 | Okamoto | G06K 9/00369 382/104 |
| 2008/0186382 | A1* | 8/2008 | Tauchi | G01S 13/89 348/148 |
| 2009/0140881 | A1* | 6/2009 | Sakai | G08G 1/164 340/901 |
| 2010/0104199 | A1* | 4/2010 | Zhang | G06K 9/00798 382/199 |
| 2010/0134325 | A1* | 6/2010 | Gomi | B60R 1/00 340/995.14 |
| 2010/0194596 | A1* | 8/2010 | Wang | B60R 1/00 340/936 |
| 2010/0245577 | A1 | 9/2010 | Yamamoto et al. | |
| 2010/0292886 | A1* | 11/2010 | Szczerba | G01C 21/365 701/31.4 |
| 2011/0128138 | A1* | 6/2011 | Yamamoto | B60W 30/0956 340/436 |
| 2011/0175752 | A1* | 7/2011 | Augst | B60R 1/00 340/905 |
| 2012/0002050 | A1* | 1/2012 | Taniguchi | H04N 7/181 348/148 |
| 2012/0105642 | A1* | 5/2012 | Nojiri | B60R 1/00 348/148 |
| 2012/0219183 | A1* | 8/2012 | Mori | G06T 7/20 382/103 |
| 2012/0257058 | A1* | 10/2012 | Kinoshita | H04N 7/181 348/148 |
| 2013/0116859 | A1* | 5/2013 | Ihlenburg | G06F 17/00 701/2 |
| 2013/0181823 | A1* | 7/2013 | Stahlin | B60K 35/00 340/436 |
| 2013/0314503 | A1* | 11/2013 | Nix | G06K 9/00805 348/46 |
| 2013/0321628 | A1* | 12/2013 | Eng | B60R 1/00 348/148 |
| 2013/0321776 | A1 | 12/2013 | Loong et al. | |
| 2014/0292805 | A1* | 10/2014 | Yamada | G09G 5/377 345/629 |
| 2014/0347485 | A1* | 11/2014 | Zhang | B60R 11/04 348/148 |
| 2015/0062141 | A1* | 3/2015 | Hayasaka | B60R 1/00 345/581 |
| 2015/0070502 | A1* | 3/2015 | Murayama | B60R 1/00 348/148 |
| 2015/0077562 | A1* | 3/2015 | Heckel | G01S 17/936 348/148 |
| 2015/0084755 | A1* | 3/2015 | Chen | G08G 1/16 340/435 |
| 2015/0103173 | A1* | 4/2015 | Takaki | B60R 11/04 348/148 |
| 2015/0139499 | A1* | 5/2015 | Shimizu | G06T 5/50 382/104 |
| 2015/0145995 | A1* | 5/2015 | Shahraray | H04N 7/181 348/148 |
| 2015/0217692 | A1* | 8/2015 | Yanagawa | B60R 1/00 348/118 |
| 2015/0254825 | A1* | 9/2015 | Zhang | B60R 1/00 382/284 |
| 2015/0353011 | A1* | 12/2015 | Baek | G06T 7/0018 348/148 |
| 2016/0001703 | A1* | 1/2016 | Iulianello | B60R 11/04 348/38 |
| 2016/0119539 | A1* | 4/2016 | Tan | H04N 5/23229 348/148 |

OTHER PUBLICATIONS

Besnard, Yoann, "Daihatsu to introduce 3D holographic screen by 2012", Apr. 2, 2008, printed from http://www-petrol-head.com/2008/04/02/daihatsu-to-int/ in 1 page.

* cited by examiner

SURROUNDINGS MONITORING SYSTEM FOR A VEHICLE

BACKGROUND

The present disclosure relates to a vehicle, and more particularly to a surroundings monitoring system therefor.

Vehicles often include side-view and rear-view mirrors to allow a driver to view an environment around the vehicle. However, areas out of the driver's vision may exist even with use of the mirrors such as due to intervening vehicle structure. As such, a driver often swivels or moves in the seat to directly view these areas. Although effective, such movements may be difficult for some drivers.

SUMMARY

A surroundings monitoring system provides a three-hundred and sixty degree view around a vehicle on a display readily viewable by the driver. The system is operable to generate manipulated image data symbology and arrange the manipulated image data symbology in response to non-image data to generate a driver perspective view. The system is also operable to replace the image data if, for example, one or more sensors are inoperable.

A surroundings monitoring system for use in a vehicle according to one disclosed non-limiting embodiment of the present disclosure includes a first sensor subsystem operable to provide image data from around the vehicle; a second sensor subsystem operable to provide non-image data from around the vehicle; a control subsystem in communication with the first sensor subsystem and the second sensor subsystem, the control subsystem operable to generate manipulated image data symbology from the image data and arrange the manipulated image data symbology in response to the non-image data to generate a driver perspective view; and a display in communication with the control subsystem to display the driver perspective view.

A method of monitoring surroundings for use in a vehicle according to another disclosed non-limiting embodiment of the present disclosure includes obtaining image data from around the vehicle; obtaining non-image data from around the vehicle; manipulating the image data in response to the non-image data to generate a driver perspective view; and displaying the driver perspective view.

A method of monitoring surroundings for use in a vehicle according to another disclosed non-limiting embodiment of the present disclosure includes obtaining image data from around the vehicle; obtaining non-image data from around the vehicle; generating manipulated image data symbology from the image data; arranging the manipulated image data symbology in response to the non-image data to generate a driver perspective view; and displaying the driver perspective view.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
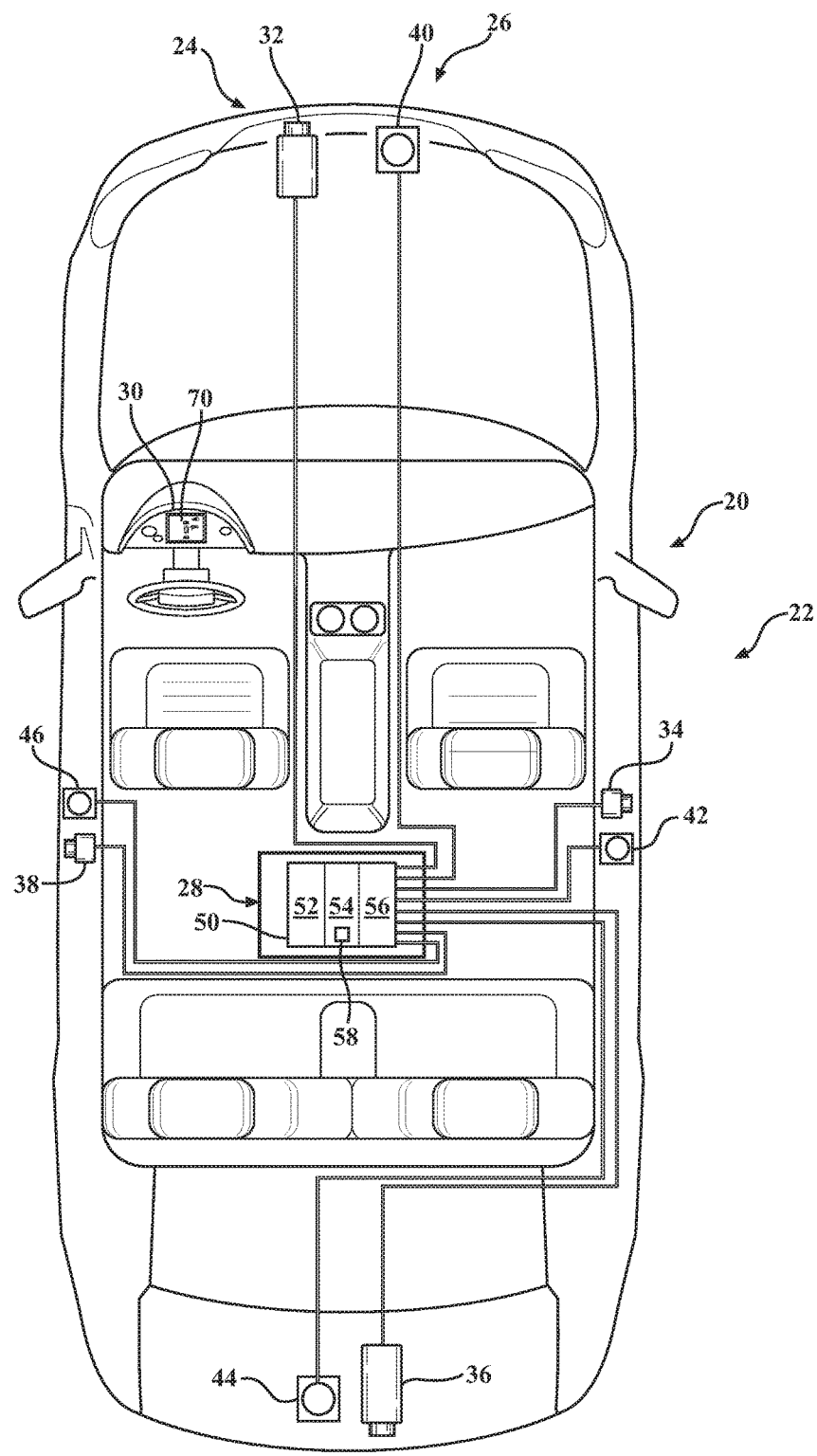
FIG. 1 is a schematic view of an example vehicle for use with a surroundings monitoring system.

FIG. 1 schematically illustrates a vehicle 20 with a surroundings monitoring system 22. Although a particular vehicle configuration is illustrated in the disclosed, non-limiting embodiment, it should be appreciated that various vehicle types will also benefit herefrom.

The system 22 generally includes a first sensor subsystem 24, a second sensor subsystem 26, a control subsystem 28 and a display subsystem 30. It should be appreciated that although particular subsystems are separately defined, each or any of the subsystems may be otherwise combined or segregated via hardware and/or software of the system 22.

Figure 2:
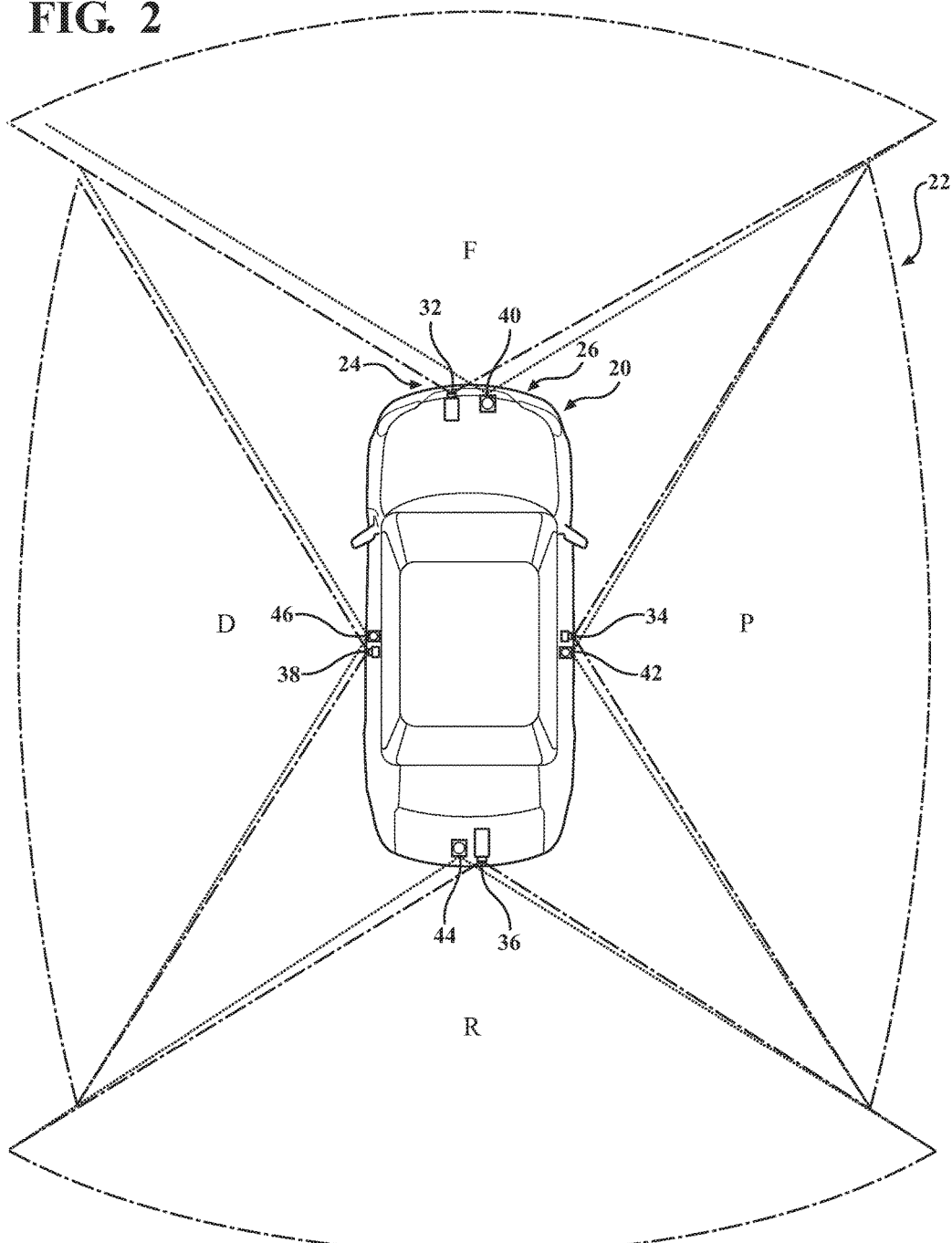
FIG. 2 is a schematic view of the view from the surroundings monitoring system.

The first sensor subsystem 24 generally includes a multiple of first sensors 32, 34, 36, 38 that respectively provide image data from within each of the front F, passenger side P, rear R and driver side D of the vehicle 20 (FIG. 2). The first sensors 32, 34, 36, 38 provide image data to the control subsystem 28. It should be appreciated that although four (4) sensors are illustrated in the disclosed non-limiting embodiment, any number of sensors will benefit herefrom.

The field of view of each the first sensors 32, 34, 36, 38 may overlap at least one adjacent sensor to provide a three-hundred and sixty degree view of that which surrounds the vehicle 20. It should be appreciated that views around the vehicle 20 may be less than a three-hundred and sixty degree view to cover only, for example, the rear one-hundred and eighty degrees. Examples of the first sensors 32, 34, 36, 38 include, but are not limited to, video cameras with or without night vision capability such as charge coupled devices, forward looking infrared, thermal systems and combinations thereof.

The second sensor subsystem 26 generally includes a multiple of second sensors 40, 42, 44, 46 that respectively provide ranging, closing velocity, distance, identification and/or other non-image data from within each of the front F, passenger side P, rear R and driver side D of the vehicle 20. The second sensors 40, 42, 44, 46 provide non-image data to the control subsystem 28. It should be appreciated that although four (4) sensors are illustrated in the disclosed non-limiting embodiment, any number of sensors will benefit herefrom.

The field of view of each of the second sensors 40, 42, 44, 46 may overlap at least one adjacent sensor to provide a three-hundred and sixty degree view of that which surrounds the vehicle 20. Examples of the second sensors 40, 42, 44, 46 include but are not limited to RADAR, SONAR, laser, LIDAR and/or other sensors and combinations thereof.

The control subsystem 28 generally includes a control module 50 with a processor 52, a memory 54, and an interface 56. The processor 52 may be any type of microprocessor having desired performance characteristics. The control module 50 may be a portion of a central vehicle control, a stand-alone unit or other system such as a cloud-based system. Other operational software for the processor 52 may also be stored in the memory 54. The memory 54 may include any type of computer readable medium that stores the data and control algorithms 58 described herein, the functions of which may be disclosed in terms of block diagrams. It should be appreciated by those skilled in the art with the benefit of this disclosure that these functions may be enacted in either dedicated hardware circuitry or programmed software routines capable of execution in a microprocessor based electronics control embodiment.

The interface 56 facilitates communication with other subsystems such as the display subsystem 30 and other onboard and offboard vehicle systems. Onboard systems include but are not limited to, a vehicle head unit that communicates with vehicle sensors that provide, for example, vehicle tire pressure, fuel level and other vehicle diagnostic information. Offboard vehicle systems provide information to include but are not limited to, weather reports, traffic, and other information. The offboard vehicle systems may also include wireless devices as part of a user input subsystem such as a key fob and/or a personal electronic device of the user, e.g. a tablet, a smart phone, a watch, eyeglasses, or other mobile devices.

The display subsystem 30 generally includes a display 70 provided on a human-machine interface within the vehicle 20 such as within an instrument cluster or a dashboard. It should be appreciated that the display 70 may be located in other positions such as within a vehicle rearview mirror, a windshield, a heads up display or another location such as a driver's eyeglasses.

Figure 3:
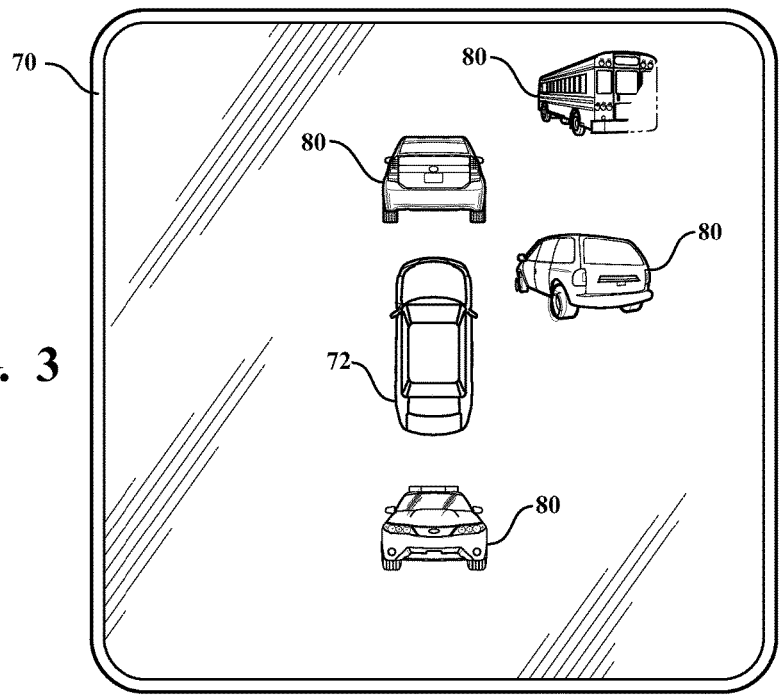
FIG. 3 is a schematic view of a display from the surroundings monitoring system according to one disclosed non-limiting embodiment illustrating manipulated image data symbology.

With reference to FIG. 3, the display 70 provides manipulated image data symbology 80 generated from image data provided from each of the first sensors 32, 34, 36, 38 around, in this disclosed non-limiting embodiment, a central symbol 72 representative of the vehicle 20. It should be appreciated that although the example central symbol 72 is illustrated as a schematic top view of a vehicle, other symbology such as an arrow, a circle, a square, or no central symbol may alternatively be utilized.

Figure 4:
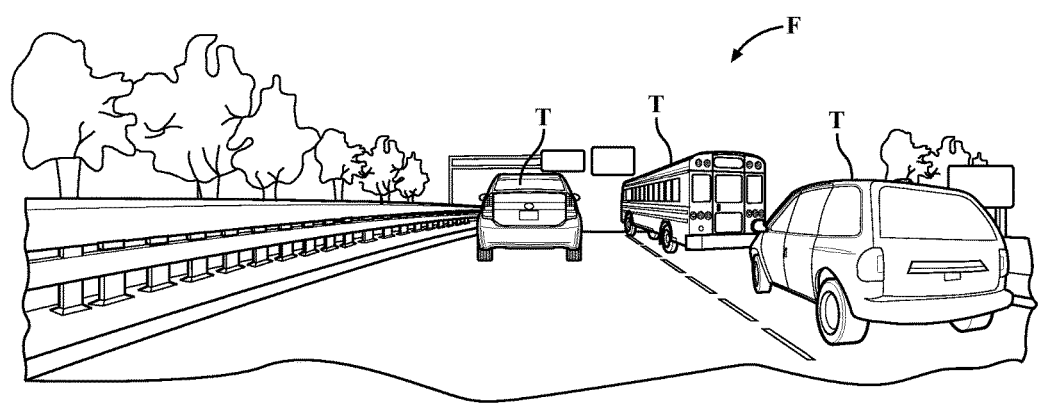
FIGS. 4 and 5 are representative image data views as seen by a first sensor subsystem from the surroundings monitoring system.

The manipulated image data symbology 80 is essentially the raw image data from the first sensors 32, 34, 36, 38 that has been manipulated through various digital image analysis processes to, for example, extract each moving target T from the surroundings (FIG. 4). For example, the manipulated image data symbology 80 in this example is a view of only each target T without background clutter, etc. It should be appreciated that the image data may be manipulated in various ways to facilitate identification and comprehension by the driver. It should also be appreciated that "target" as utilized herein is typically with reference to other vehicles on the road with the vehicle 20, but may also include pedestrians, animals and other objects around the vehicle 20.

Figure 5:
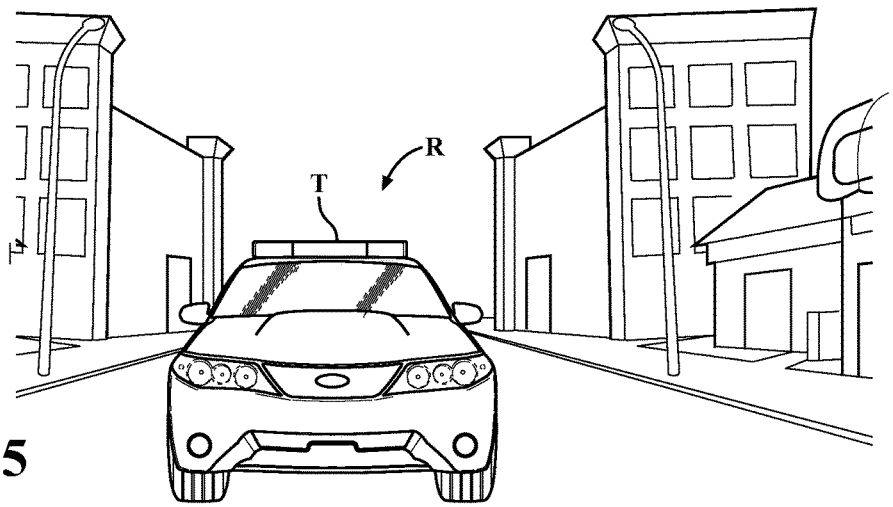

In one disclosed non-limiting embodiment, the control subsystem 28 is operable to utilize the non-image data from the multiple of second sensors 40, 42, 44, 46 to identify, for example, relative position, distance, closure, aspect, etc., to each target T. The control subsystem 28 is also operable to arrange the manipulated image data symbology 80 on the display 70 in response to data from the multiple of second sensors 40, 42, 44, 46 to provide a three-hundred and sixty degree view around the vehicle 20 on the display 70 that represents, for example, the relative position, perspective, distance, closure, aspect, etc., to each target T (FIGS. 4 and 5). That is, the manipulated image data symbology 80 such as each target T without background clutter is arranged on the display 70 in its relative position.

The manipulated image data symbology 80 of each target T (e.g., an adjacent vehicle), from each of the first sensors 32, 34, 36, 38 is presented from the driver's perspective as if the driver was, for example, looking through the rear window or over the driver's shoulder to directly visually view the target T (e.g., another vehicle adjacent to the vehicle 20). The manipulated image data symbology 80 of each target T thereby provides a driver perspective of each target T without intervening vehicle structure or the need for the driver to swivel in the seat.

Figure 6:
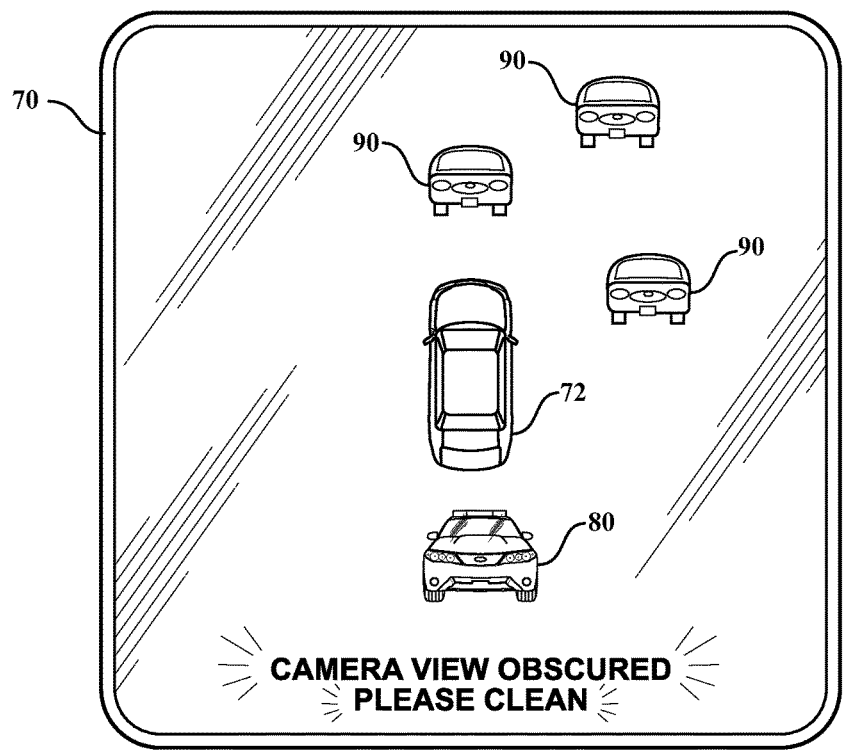
FIG. 6 is a schematic view of a display from the surroundings monitoring system illustrating representative symbology and manipulated image data symbology.

With reference to FIG. 6, the control subsystem 28 is further operable to alternatively or additionally generate representative symbology 90 representative of the target T—rather than actual manipulated image data symbology 80—that replaces or completes the manipulated image data symbology 80 if, for example, one or more of the first sensors 32, 34, 36, 38 have an obscured view or are inoperable. That is, the view of the target T is represented by symbology such as an appropriately sized box or schematic vehicle icon rather than the manipulated image data symbology 80 from the first sensors 32, 34, 36, 38. The view of the target T may also be completed or otherwise sensor fused such that one or more targets T are displayed as a combination of representative symbology 90 and manipulated image data symbology 80. Alternatively, or in addition, an alert such as "Camera View Obscured—Please Clean" is also displayed when other than the manipulated image data symbology 80 is displayed.

Figure 7:
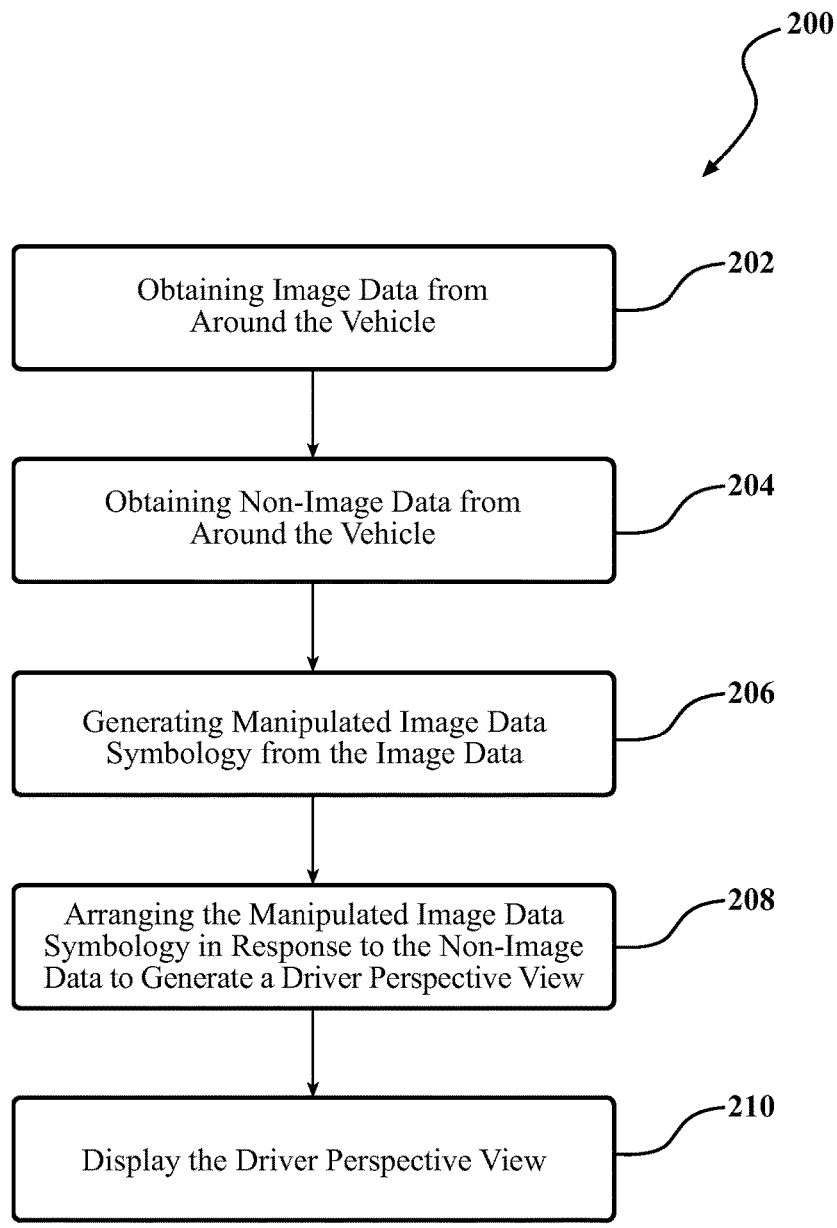
FIG. 7 is a schematic block diagram of the functions of a control algorithm of the surroundings monitoring system according to one disclosed non-limiting embodiment.

With reference to FIG. 7, a method 200 according to one disclosed non-limiting embodiment initially includes obtaining image data the first sensor subsystem 24 (step 202) and non-image data from the second sensor subsystem 26 (step 204) from around the vehicle 20. Next, manipulated image data symbology 80 is generated from the image data provided by the first sensor subsystem 24 and the non-image data from the second sensor subsystem 26 (step 206).

The manipulated image data symbology 80 is then arranged (step 208) to provide a relative position for the manipulated image data symbology 80 on the display 70 from the driver perspective (step 210). In this disclosed non-limiting embodiment the manipulated image data symbology 80 may be displayed in a relative position that generally or exactly corresponds to that of the target T. The view on the display 70 is generally that of the driver perspective as if the driver was physically looking at the target T, e.g., over the shoulder or though a mirror. Should, for example, the view from the first sensor subsystem 24 be obscured, the control subsystem 28 generates representative symbology 90 to replace or complete the manipulated image data symbology 80 to provide a sensor fused display. The representative symbology 90 may also augment the view with, for example, night vision or other information to provide the sensor fused display.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A surroundings monitoring system for use in a vehicle, comprising:
   a first sensor subsystem operable to provide image data from around the vehicle; a second sensor subsystem operable to provide non-image data from around the vehicle;
   a control subsystem in communication with the first sensor subsystem and the second sensor subsystem, the control subsystem operable to:
   when a view from the first sensor subsystem is obscured with respect to targets around the vehicle, generate representative symbology that schematically portrays the targets,
   when a view from the first sensor subsystem is unobscured with respect to targets around the vehicle, generate, from images of the targets in the image data, manipulated image data symbology that portrays only the targets, from a driver perspective, and
   based on ranging data for the targets in the non-image data, horizontally spatially arrange the generated representative and manipulated image data symbology around a central vehicle symbol in an overhead view around the vehicle that portrays, via the horizontal spatial arrangement of the generated representative and manipulated image data symbology around the central vehicle symbol, the relative positions of the targets around the vehicle in a horizontal plane; and
   a display subsystem in communication with the control subsystem and located within the vehicle operable to display the overhead view around the vehicle.

2. The system as recited in claim 1, wherein the image data includes video.

3. The system as recited in claim 1, wherein the first sensor subsystem includes a multiple of first sensors that respectively provide image data from each of a front, passenger side, rear, and driver side of the vehicle.

4. The system as recited in claim 3, wherein each of the multiple of first sensors includes at least one of a camera, a charge coupled device, a forward looking infrared, and a thermal system.

5. The system as recited in claim 1, wherein the second sensor subsystem includes a multiple of second sensors that respectively provide non-image data from each of a front, passenger side, rear, and driver side of the vehicle.

6. The system as recited in claim 1, wherein each of the multiple of second sensors includes at least one of RADAR, SONAR, laser, and LIDAR.

7. The system as recited in claim 1, wherein the display subsystem is located within a human-machine interface within the vehicle.

8. The system as recited in claim 1, wherein the display subsystem is located on a windshield within the vehicle.

9. The system as recited in claim 1, wherein the control subsystem is operable to horizontally spatially arrange the generated representative and manipulated image data symbology to focus upon a target in response to the non-image data.

10. The system as recited in claim 1, wherein the control subsystem is operable to extract the images of the targets from their surroundings in the image data to generate the manipulated image data symbology.

11. The system as recited in claim 1, wherein the overhead view is a three-hundred and sixty degree overhead view around the vehicle.

12. A method of monitoring surroundings for use in a vehicle, comprising:
    obtaining image data from around the vehicle from a first sensor subsystem;
    obtaining non-image data from around the vehicle from a second sensor subsystem;
    when a view from the first sensor subsystem is obscured with respect to targets around the vehicle, generate representative symbology that schematically portrays the targets, when a view from the first sensor subsystem is unobscured with respect to targets around the vehicle, generating, from images of the targets in the image data, manipulated image data symbology that portrays only the targets, from a driver perspective;
    based on ranging data for the targets in the non-image data, horizontally spatially arranging the generated representative and manipulated image data symbology around a central vehicle symbol in an overhead view around the vehicle that portrays, via the horizontal spatial arrangement of the generated representative and manipulated image data symbology around the central vehicle symbol, the relative positions of the targets around the vehicle in a horizontal plane; and
    displaying the overhead view around the vehicle.

13. The method as recited in claim 12, further comprising:
    extracting the images of the targets from their surroundings in the image data to generate the manipulated image data symbology.

14. The method as recited in claim 12, wherein the overhead view is a three-hundred and sixty degree overhead view around the vehicle.

* * * * *

UNITED STATES PATENT AND TRADEMARK OFFICE
CERTIFICATE OF CORRECTION

PATENT NO.        : 9,598,012 B2
APPLICATION NO.   : 14/205296
DATED             : March 21, 2017
INVENTOR(S)       : Nagata et al.

Page 1 of 1

It is certified that error appears in the above-identified patent and that said Letters Patent is hereby corrected as shown below:

In the Claims

Column 6, Line 43: replace "the vehicle, generate" with -- the vehicle, generating --
Column 6, Line 45: replace "the targets, when" with -- the targets, and when --

Signed and Sealed this
Twelfth Day of September, 2017

Joseph Matal
*Performing the Functions and Duties of the
Under Secretary of Commerce for Intellectual Property and
Director of the United States Patent and Trademark Office*